(12) United States Patent
Meissner et al.

(10) Patent No.: US 9,361,093 B2
(45) Date of Patent: Jun. 7, 2016

(54) REVOKING A ZERO DOWNTIME UPGRADE

(71) Applicants: Steffen Meissner, Heidelberg (DE);
Wieland Hoprich, Mannheim (DE);
Heiko Konrad, Hockenheim (DE);
Lars-Eric Biewald, Mannheim (DE);
Volker Driesen, Heidelberg (DE)

(72) Inventors: Steffen Meissner, Heidelberg (DE);
Wieland Hoprich, Mannheim (DE);
Heiko Konrad, Hockenheim (DE);
Lars-Eric Biewald, Mannheim (DE);
Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 92 days.

(21) Appl. No.: 14/504,235

(22) Filed: Oct. 1, 2014

(65) Prior Publication Data
US 2016/0098267 A1 Apr. 7, 2016

(51) Int. Cl.
*G06F 9/44* (2006.01)
*G06F 7/00* (2006.01)
*G06F 9/445* (2006.01)
*G06F 17/30* (2006.01)

(52) U.S. Cl.
CPC ............ *G06F 8/67* (2013.01); *G06F 17/30292* (2013.01); *G06F 17/30339* (2013.01); *G06F 17/30345* (2013.01)

(58) Field of Classification Search
CPC ................ G06F 8/67; G06F 17/30292; G06F 17/30339; G06F 17/30345
USPC .................. 717/168–178; 707/674–686, 702, 707/802–812
See application file for complete search history.

(56) References Cited

U.S. PATENT DOCUMENTS

| | | | | |
|---|---|---|---|---|
| 7,523,142 | B2 * | 4/2009 | Driesen | G06F 17/30286 |
| 8,521,706 | B2 * | 8/2013 | Alpern | G06F 17/30306 |
| | | | | 707/695 |
| 2003/0130985 | A1 * | 7/2003 | Driesen | G06F 17/30286 |
| 2008/0098046 | A1 * | 4/2008 | Alpern | G06F 17/30306 |
| 2010/0262959 | A1 * | 10/2010 | Bruno | G06F 21/6209 |
| | | | | 717/171 |

* cited by examiner

*Primary Examiner* — Qing Chen
(74) *Attorney, Agent, or Firm* — Mintz Levin Cohn Ferris Glovsky and Popeo, P.C.

(57) ABSTRACT

Revocation of a zero downtime upgrade of an upgrade procedure of a source system to a target system is initiated. Thereafter, upgrade activities are stopped at the target system and production activities are stopped at the source system. At least a portion of the target tables can be subsequently dropped and any associated table structure changes can be revoked. At least a portion of the target tables are then switched from use by the target system to use by the source system. Next, the source system is connected to the source database schema to enable use of the source system in its state prior to the initiation of the upgrade procedure. Related apparatus, systems, techniques and articles are also described.

19 Claims, 29 Drawing Sheets

400

Shadow System

Upgrade: Delta Import & Migration

1500
FIG. 15
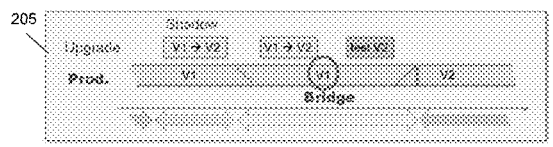
Stop Production
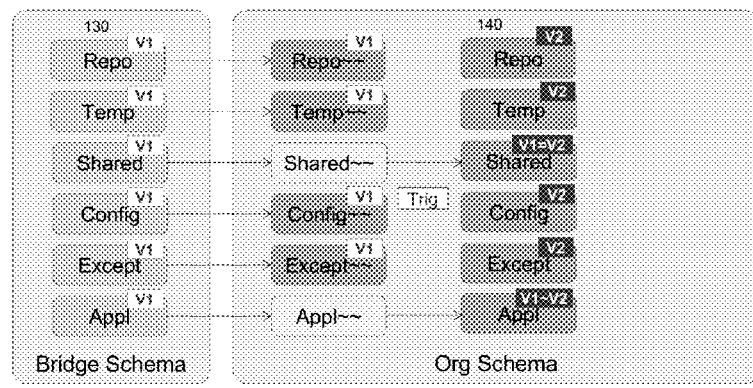

1600
FIG. 16
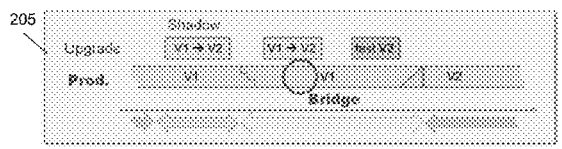
Drop Target Tables,
Revoke structure changes
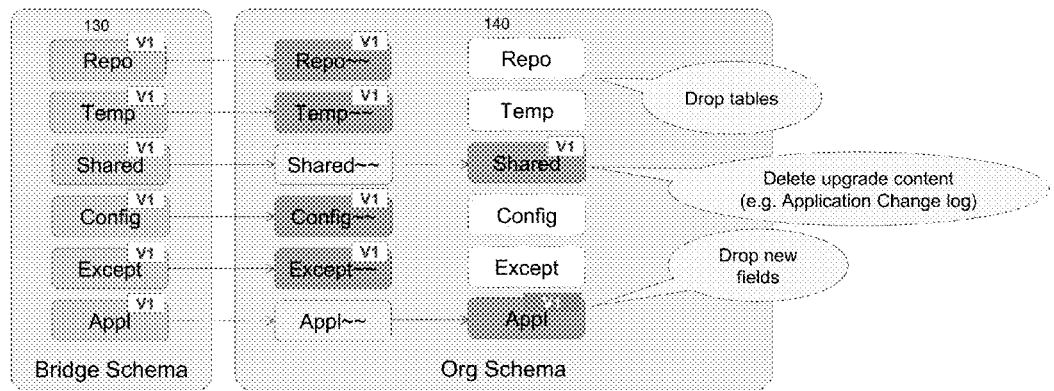

1700
FIG. 17
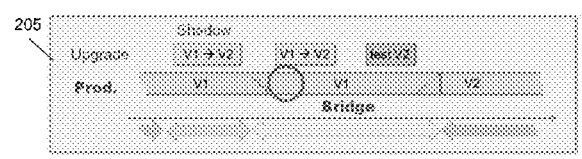
Switch Back
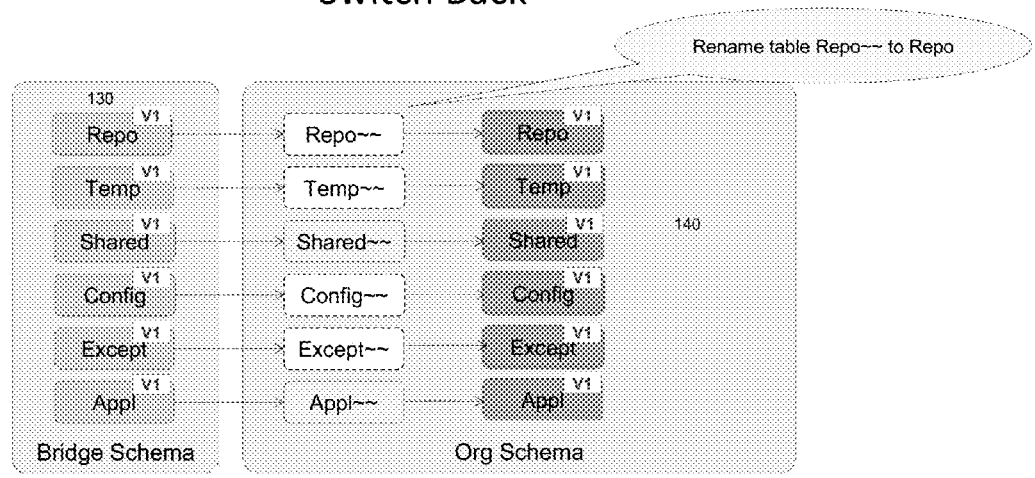

Back on standard, start Production

FIG. 24
Re-Connect to Standard with M-Freeze

2700

Back on Start

REVOKING A ZERO DOWNTIME UPGRADE

TECHNICAL FIELD

The subject matter described herein relates to the revocation of a zero downtime upgrade from a source system to a target system.

BACKGROUND

Deployment of maintenance packages to computing platforms often require downtime of such platforms. At the beginning of downtime, a backup is created and this backup serves as a fallback option, in case the upgrade fails. Advancements in technology have enabled for reduced, and in some cases, zero downtime upgrades. With such arrangements, upgrades run in parallel to a production system within the same database for the complete duration of the upgrade. The procedure creates clones of the tables, which are changed by the upgrade and runs database triggers to replicate data from production to the upgrade copy of the tables. With the maintenance procedure running in parallel with the production system in the same database, the upgrade can no longer be revoked by restoring a backup.

A restore of a backup is usually done as a point-in-time recovery: the full backup is restored, then the re-do-logs of the changes done to the system between the point in time of the full backup and the point in time, the administrator wants to restore are rolled forward. Such restores can only be run for the complete database.

If the upgrade runs into a problem, which requires stopping the upgrade and returning to the software version which had been used before the upgrade, only parts of the database need to be restored, other parts of the database cannot be restored as a restore of the production part would result in data loss.

SUMMARY

In one aspect, revocation of a zero downtime upgrade procured upgrading a source system to a target system is initiated. The upgrade procedure prepares software for the target system in parallel to operation of the source system by selectively (i) renaming source tables of the source system, (ii) cloning the renamed source tables for the target system, (iii) equipping the cloned tables with equipped with database triggers to transfer data to target tables used by the source system according to a source database schema, (iv) generating the target tables comprising updated software content for later use by the target system while the source tables are used via a bridge database schema, and (v) sharing tables between the source database schema accessed via the bridge database schema and the target system. Thereafter, upgrade activities are stopped at the target system and production activities are stopped at the source system. At least a portion of the target tables can be subsequently dropped and any associated table structure changes can be revoked. At least a portion of the target tables are then switched from use by the target system to use by the source system. Next, the source system is connected to the source database schema to enable use of the source system in its state prior to the initiation of the upgrade procedure.

Stopping the upgrade activities at the target system can include at least one of: stopping upgrade dialog instances, removing limitations on writing for at least a portion of the tables, or dropping the cloned tables, dropping triggers on the source tables.

Stopping production activities at the source system can include at least one of: finishing batch jobs, logging off users, or running any queues until such time as they become empty.

Dropping of the target tables and revoking any associated table structure changes can include at least one of: dropping the cloned tables, dropping pre-defined fields added to at least one of the generated target tables, or deleting at least a portion of content added to tables shared by the source system and the target system.

Switching at least a portion of the target tables from use by the target system to use by the source system can include renaming at least one table according to a format used by the source database schema.

Connecting the source system to the source database schema can include starting production instances and enabling users to login.

In some implementations, artifacts associated with the upgrade procedure can be removed. The artifacts can include at least one of: an alias of a table, a view of a table, the bridge database schema, or objects temporarily created by the upgrade procedure for the duration of the upgrade.

In an interrelated aspect, revocation of a zero downtime upgrade upgrading a source system to a target system is initiated. The upgrade procedure prepares software for the target system in parallel to operation of the source system by selectively (i) renaming source tables of the source system, (ii) cloning the renamed source tables for the target system, (iii) equipping the cloned tables with equipped with database triggers to transfer data to target tables used by the source system according to a source database schema, (iv) generating the target tables comprising updated software content for later use by the target system while the source tables are used via a bridge database schema, and (v) sharing tables between the source database schema accessed via the bridge database schema and the target system. Thereafter, upgrade activities at the target system are stopped. In addition, the target tables are dropped and any associated table structural changes are revoked. At least a portion of the target tables are switched from use by the target system to use by the source system. The source system is later connected to the source database schema to enable use of the source system in its state prior to the initiation of the upgrade procedure.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, in contrast to conventional techniques, the current subject matter allows for revocation procedures to be implemented during an upgrade without the need for downtime.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIGS. 13-19 provide a sequence of revocation of a zero downtime upgrade procedure with reduced downtime;

FIGS. 20-27 provide a sequence of revocation of a zero downtime upgrade procedure with no downtime;

Like reference symbols in the various drawings indicate like elements.

DETAILED DESCRIPTION

The current subject matter enables revocation of zero downtime upgrades by providing a procedure on the same level as the upgrade deploy tool, which executes steps, revoking actions of the initial deployment on a database table level. Various types of zero downtime maintenance/upgrade procedures can be utilized such as that described in U.S. Pat. App. Pub. No. 20130238555 entitled: "Aliases for accessing shared tables during provision of continuous access during application upgrade" and in U.S. Pat. App. Pub. No. 20130238868 "Using temporary system to provide continuous access during application upgrade", the contents of both of which are hereby fully incorporated by reference. As will be described in further detail below, if a table is populated during the upgrade, the upgrade procedure creates a copy of the table, installs a database trigger to replicate all changes done by production from the production table to the upgrade's copy. At the end of the upgrade, the access of production is switched to the target table. For the revoke procedure, the copy of the table created for the upgrade can be dropped and usage can remain with the original table. Similar approaches can be defined for all other table categories.

Figure 1:
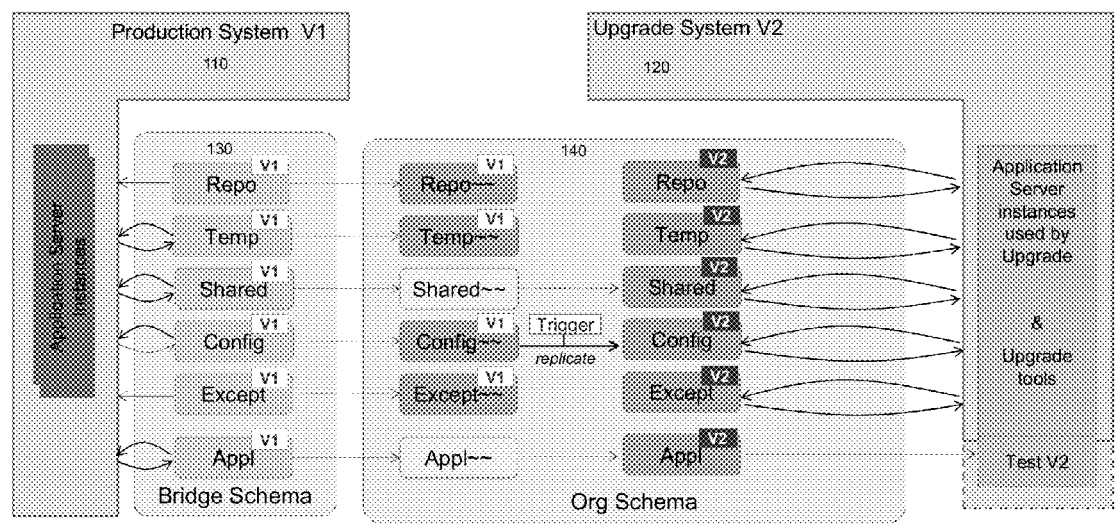
FIG. 1 is a first diagram illustrating a zero downtime upgrade procedure.

FIG. 1 is a diagram 100 illustrating a process of a zero downtime upgrade of a production system 110 (sometimes referred to as a source system) to an upgrade system 120 (sometimes referred to as a target system). The production system 110 runs various application server instances executing a first version of software (as indicated by the designation V1) and the upgrade system 120, when upgraded, runs various application server instances running a second version of software (as indicated by the designation V2). As part of a zero-downtime upgrade from the production system 110 to the upgrade system 120, a bridge schema 130 provides various tables of data that are in turn used by an original schema 140 to generate/populate alias tables that, in turn, are used to generate tables that are ultimately used by the upgrade system 120. In some cases, the upgrade system 120 can be tested prior to going live. Further details are provided below.

Figure 2:
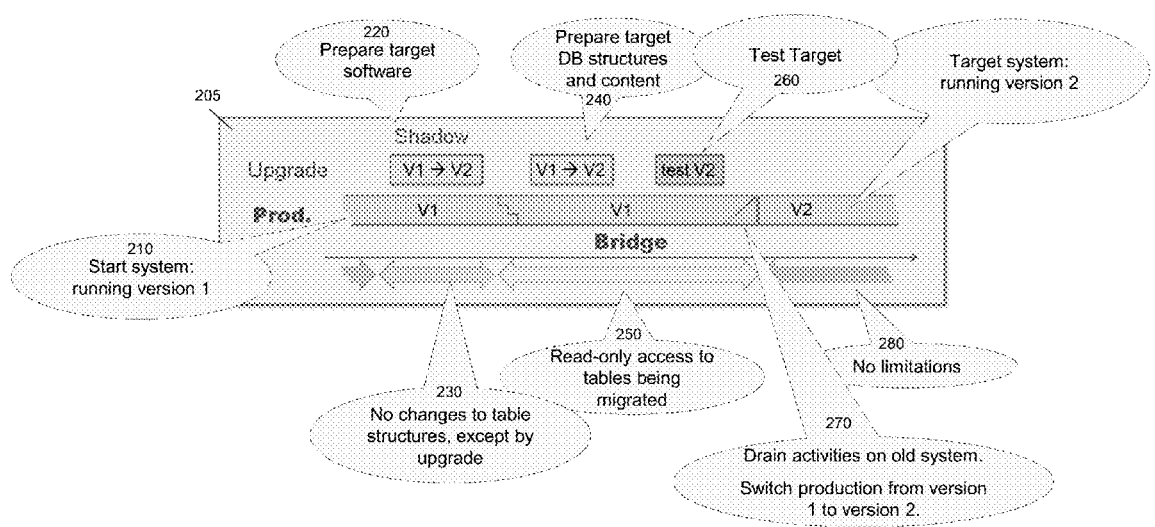
FIG. 2 is a first diagram illustrating a zero downtime upgrade procedure.
Figure 3:
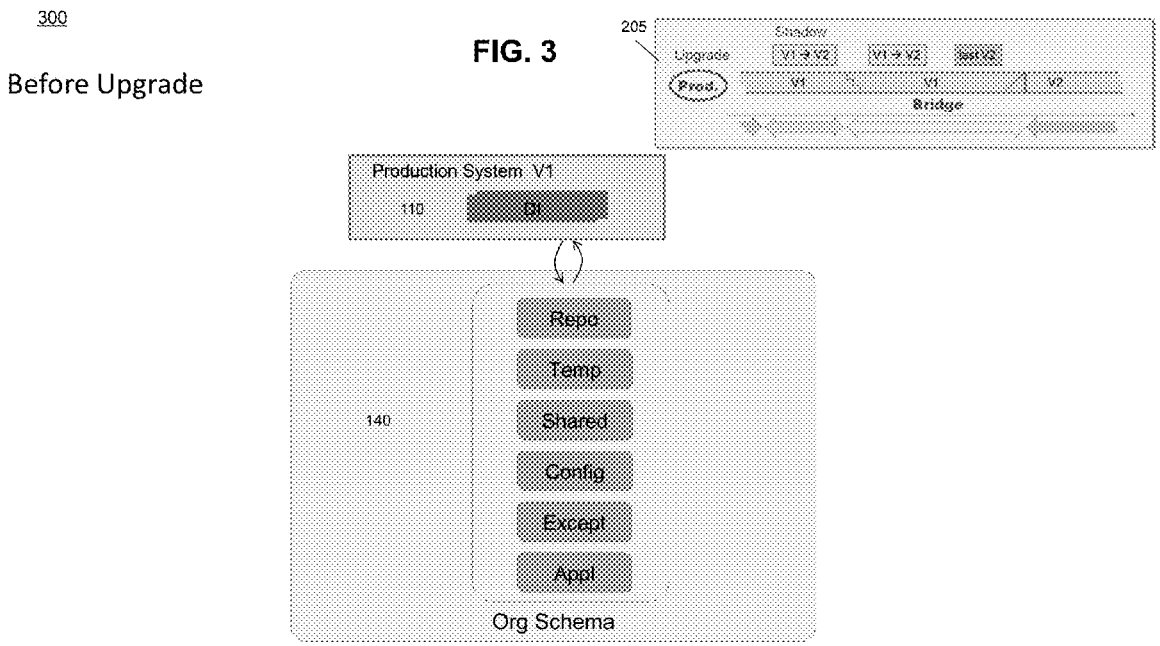
FIGS. 3-12 provide a sequence of a zero downtime upgrade procedure.

FIG. 2 is a diagram 200 providing an overview of a zero downtime upgrade process moving from version 1 (V1) software on a production system to version 2 (V2) software on the target system. With reference to the legend 205, at 210, the production system is initially running version 1 software. Subsequently, at 220, target software including (shadow tables) is prepared. No changes are made, at 230, to table structures except where upgrades require changes. Thereafter, at 240, target database structures and content are prepared. During such time, at 250, the tables being migrated are only accessible via read-only access. Prior to deployment, at 260, the target software can be tested. If the testing is successful, at 270, production is switched from version 1 to version 2 and, at 280, activities are drained/ceased on the old production system.

Stated differently, a zero downtime maintenance procedure can work by first generating upgrade scripts. Thereafter, revoke scripts can be generated. Next, the application upgrade package can be analyzed so that it can be derived which tables get content by the upgrade package, are changed in structure by the upgrade package (so that such tables can be categorized based on their treatment in the upgrade). In addition, the target software (i.e., the upgraded software) can be prepared in parallel to production use. The target database tables are also prepared. In case the table gets content, it is cloned: a copy can be created including all content and one or more triggers ensure the content remains up-to-date to changes. In cases in which a table's content is migrated, a copy of the table is created and the original table can be designated as read-only and a migration report can be run. Thereafter, the upgraded content is deployed to the cloned tables. After the target version is tested and confirmed to be working properly, users can be switched to the target version.

The zero downtime revoke procedure can work as follows. First, the upgrade instance can be stopped. Thereafter, persistent enqueue locks (i.e., locks against write operations by the applications that provide an exclusive change permission by the upgrade procedure for certain objects, etc.) on the upgrade tables can be removed. Furthermore, entries and fields associated with the upgrade can be removed in shared tables. In cases in which a bridge table is used, the original table can be dropped. Thereafter, the tables can be switched from the bridge to the original. Old views on original tables can be created and the original instance can be started with a standard connect. Thereafter, users can be switched back to the original version and any remaining instances can be restarted with standard connect. Furthermore, any unused remainders of the upgrade can be removed.

The tables in the database can be sorted into various categories. First, there are the Config tables that receive the content for the upgrade. The Config tables can be cloned by creating a copy of the table and having a database trigger replicate all data from the table used by production to the table used by the upgrade to deploy new data. For the Config tables, the revoke procedure drops the table used by the upgrade. The table used by production is consistent in structure and content with respect to the start release. Furthermore, upon the switch of production to target version, the production is configured to use also the target table.

Another type of table does not receive content for the upgrade but their structure is adjusted (e.g., new fields are added, etc.). The access by production to such tables can be redirected to a projection view on the table. The view can include the same fields of the table's structure as of the start release version. Subsequently, these tables can be extended on the database level through the addition of new fields. The production can access this extended table. For these tables, the revoke can cause these new fields to be dropped. Furthermore, upon the switch from the production version to the target version, the production is configured to use the table and not the projection view.

There can additionally be tables that are not touched by the upgrade. That is, neither the structure nor the content of such tables are changed. With such tables, locks can be set, either for the complete table or for single rows. The revoke procedures causes the release of the locks. Furthermore, for the switch to the target version, the locks are released as well.

Another type of table can be referred to as an "Except" exception table. With these tables, other types of changes are made (i.e., an application program modifies the content of the table to match the target version) that can be put to read-only for the bridge. For example, if a field is set to be longer, the table is then part of the Except category. These tables can be set to read-only for the production. A table with a different name can be created, but with the tables target structure. Thereafter, a batch job can be run, which transfers all data from the original table to the target table. Upon the switch of production to target version, the production can be configured to also use also target table. For the revoke procedure, the system can be configured to use the old version of the table.

For the revoke procedure, for the tables receiving convent by the upgrade (Config tables), the table used by the upgrade is dropped. The table used by production is consistent in structure and content with respect to the start release.

In addition, for tables not receiving content, the structure is adjusted (e.g., new fields are added) (some of the Appl tables). For these tables, the revoke procedure drops the additional columns. Afterwards, the access of production can be re-directed to the table directly, no longer going through the view. Afterwards, the view can be dropped.

For tables not touched by the upgrade, neither in structure nor in content (remaining Appl tables), the locks on rows or on complete tables are dropped. Changes of other type are done to tables which are put to read-only for the bridge (Except tables) (e.g., a field is set to be longer, etc.).

Figure 4:
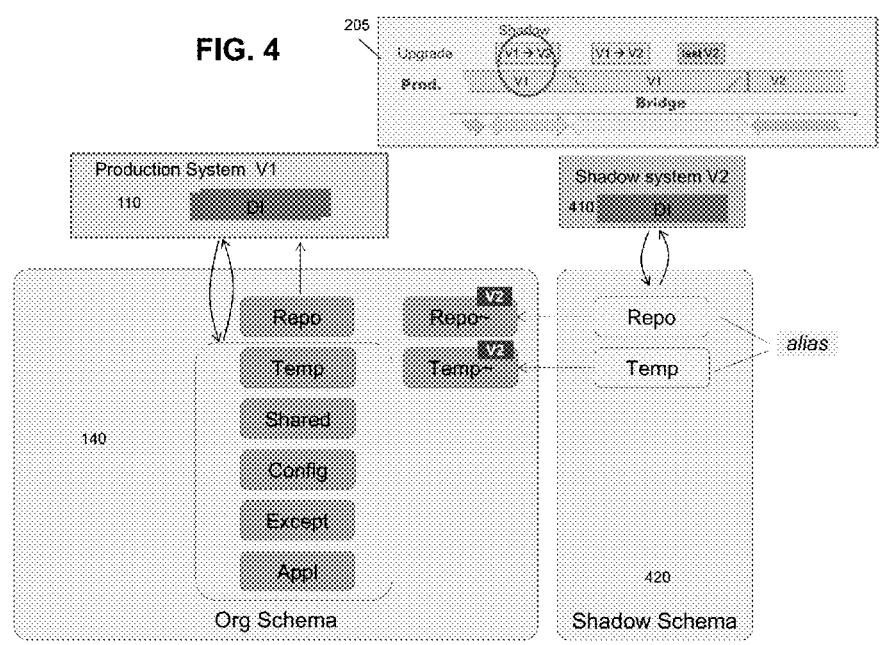

FIGS. 3-12 provide an overview zero downtime upgrade procedure. With reference to diagram 300 of FIG. 3, before the upgrade, user can use a dialog instance connected to a standard schema. Diagram 400 of FIG. 4 illustrates an uptime and shadow system period in which preparation checks are run. Maintenance mode is switched on (no changes to table structures except by upgrade). In addition, a shadow system 400 with shadow schema 410 is set up, the target software is deployed to tables "Repo~" and the target structures of the tables are computed. The shadow system is a mechanism to prepare the content in the shadow tables named TABLE~, e.g. for the repository content stored in Repo~. Details regarding the use of a shadow system can be found in U.S. Pat. No. 7,523,142 entitled: "Systems, methods and articles of manufacture for upgrading a database with a shadow system", the contents of which are hereby fully incorporated by reference. Changes brought by the upgrade can be analyzed to determine which tables for migration are to be cloned later. In addition, the content brought by the upgrade can be analyzed to determine which tables to later clone.

Figure 5:
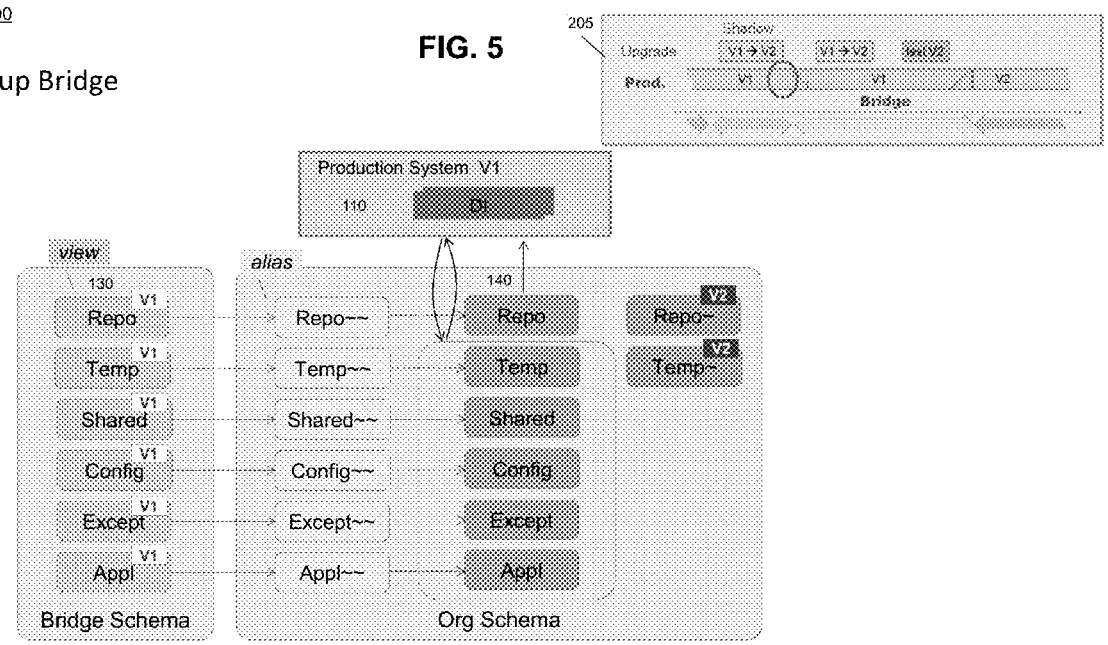

With reference to diagram 500 of FIG. 5, an alias "TABLE~~" for all tables "TABLE" is created. In addition, a second database schema "bridge schema" 130 can be created as well as a view "TABLE" for all aliases in the original schema "TABLE~~". Additionally, in the bridge schema a view is created for all tables, which do not have a TABLE~~ counterpart. The views have the structure of the tables of the start release.

Figure 6:
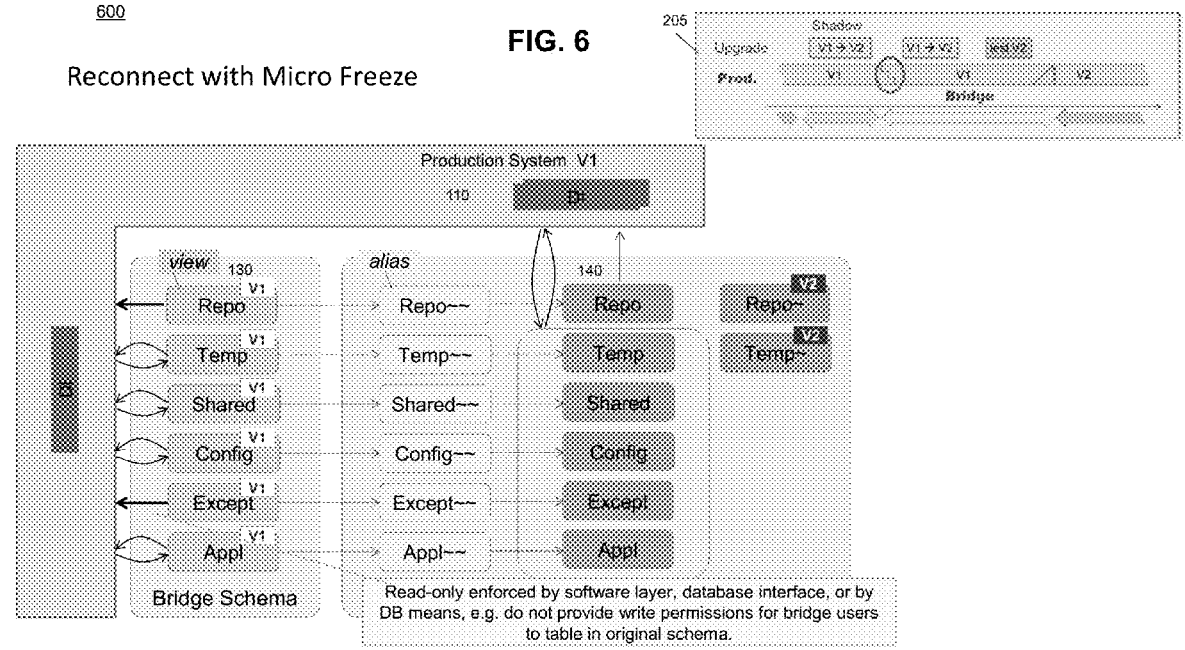

With reference to diagram 600 of FIG. 6, dialog instances can be reconnected from the original schema 140 to the bridge schema 130. The dialog instances "suspend" all actions by users, disconnect from the DB original schema 140 and connect to bridge schema 130. Further, as part of a bridge operation period, production runs on the production system 110 connected to the bridge schema and tables, which will be migrated later, are designated as read-only.

Figure 7:
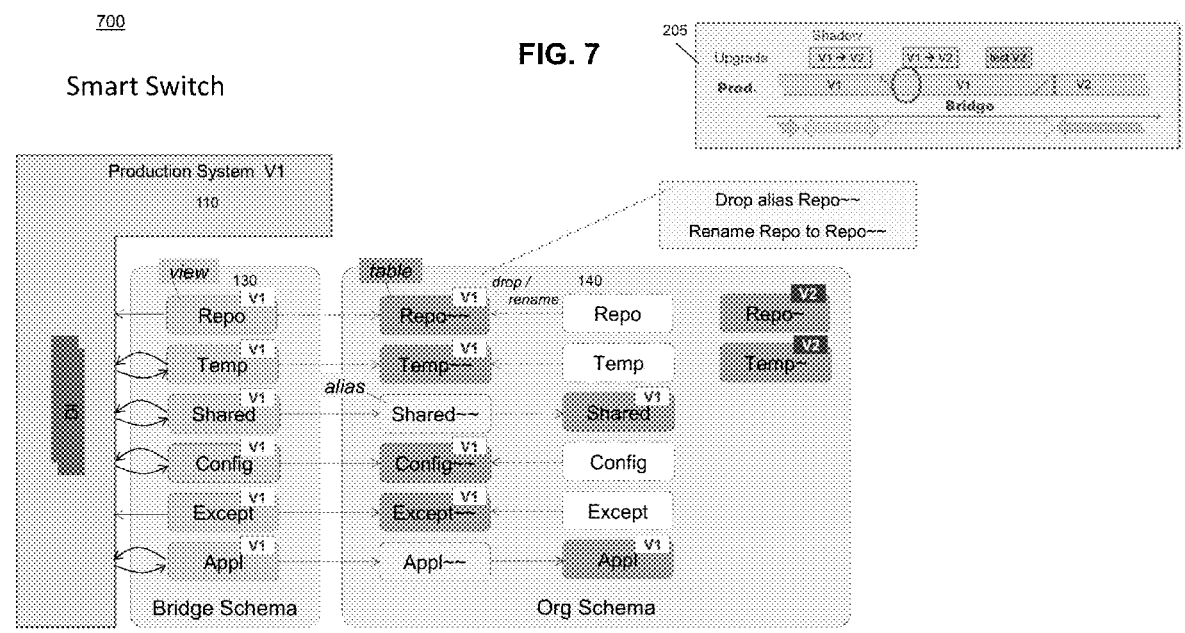

With reference to diagram 700 of FIG. 7, for a smart switch, for those tables that are switched from shadow ("Repo", "Temp") or cloned later, ("Config", "Except"), a smart switch is run. The smart switch causes the alias "Repo~~" to be dropped and the table "Repo" to be renamed to "Repo~~".

Figure 8:
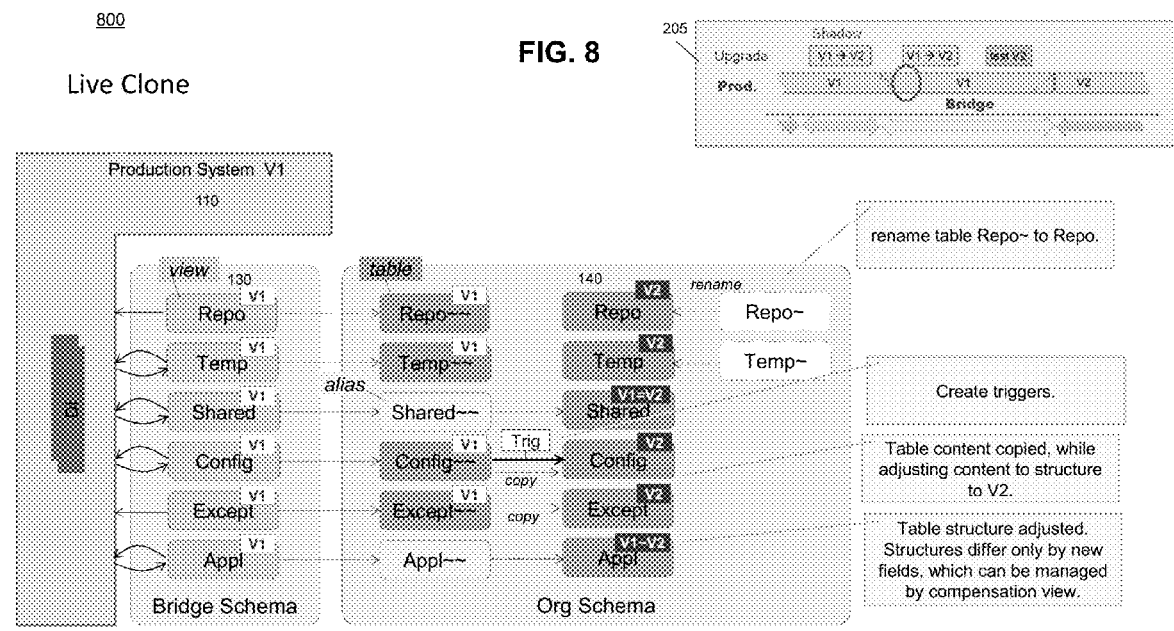

With reference to diagram 800 of FIG. 8, as part of a live clone process, the shadow tables are renamed ("Repo~", "Temp~") and Repo~ is renamed to Repo. The tables are created with the target structure ("Config", "Except"). A trigger is created for the "Config" tables, which transfers all changes done by production to Config~~ to Config. The unchanged data is then copied from Config~~ to Config. The tables, which are shared ("Share" and "Appl") are adjusted structure-wise. New fields can be added (with more complex structure change resulting in the table being in category "Except").

Figure 9:
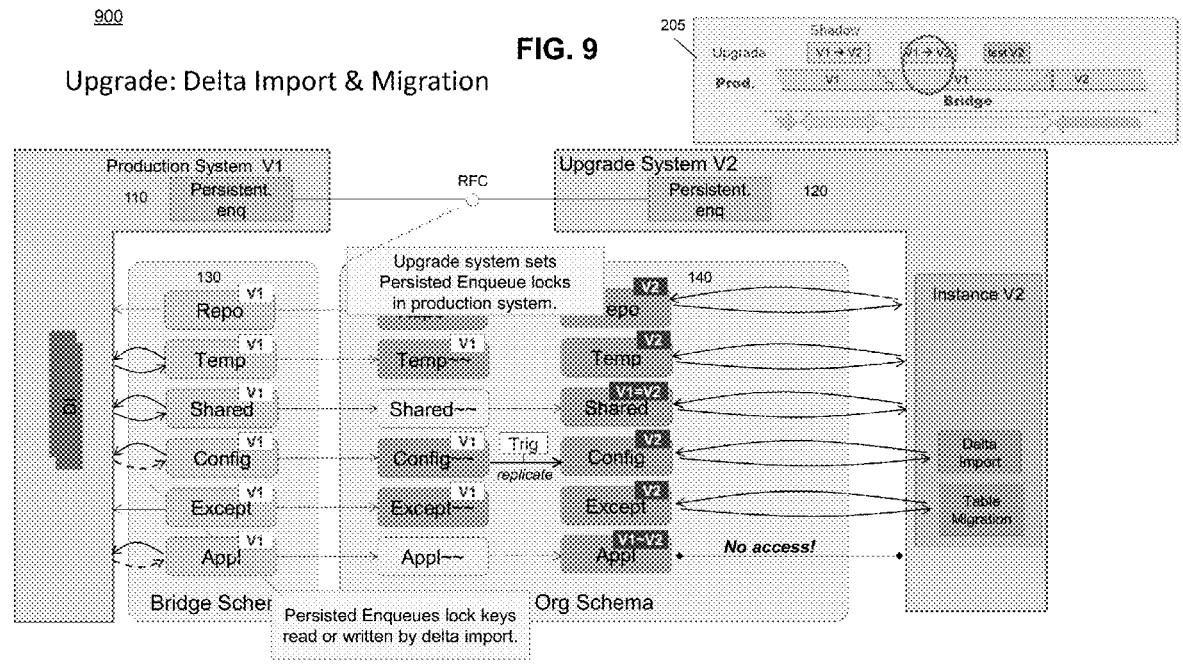

With reference to diagram 900 of FIG. 9, as part of delta import and table migration, the content brought by the upgrade is deployed to the config tables. The import of content can also be done by programs running in the application server. The tools create persistent enqueue locks in the production system for changed keys, where the production shall not change content any mode. For other changes, where production and upgrade change the same keys, the changes are not replicated, the upgrade wins.

Figure 10:
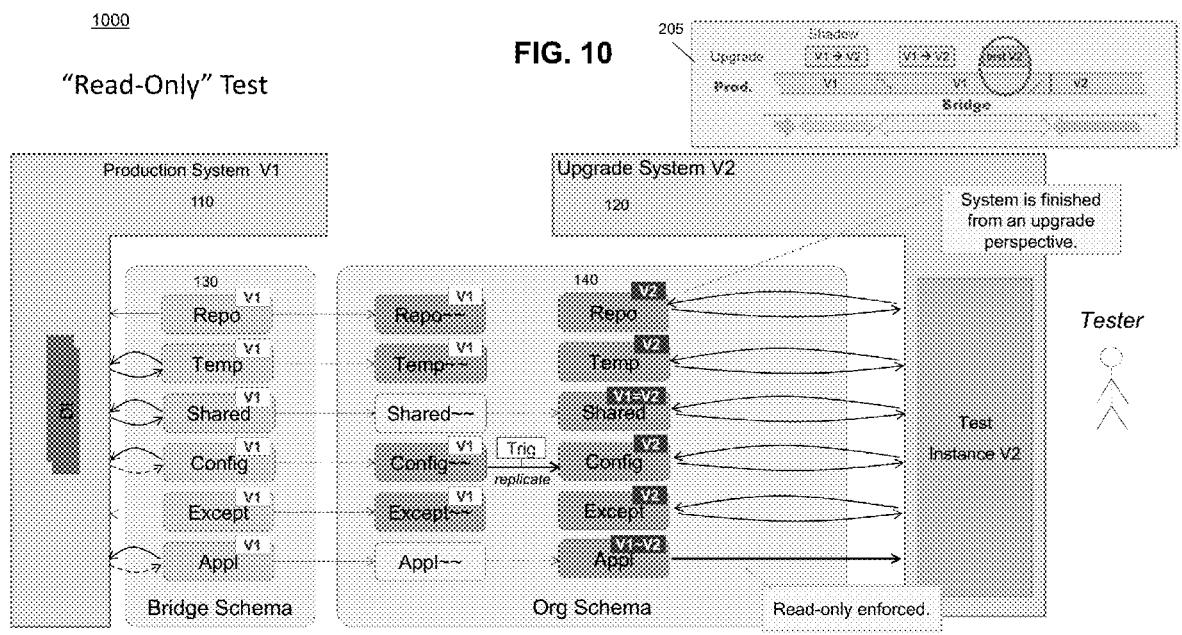

With reference to diagram 1000 of FIG. 10, for read-only tests, the application tables are equipped with freeze triggers. These triggers ensure, no content changes can be done by the database user of the original schema 140. The user of the bridge schema 130 can still change content. In addition, the dialog instances of the upgrade are started and opened for test users. Further, users can read all data, they can write data of category "Repo", "Config", "Share", "Temp" and "Exception". Application data cannot be changed.

Figure 11:
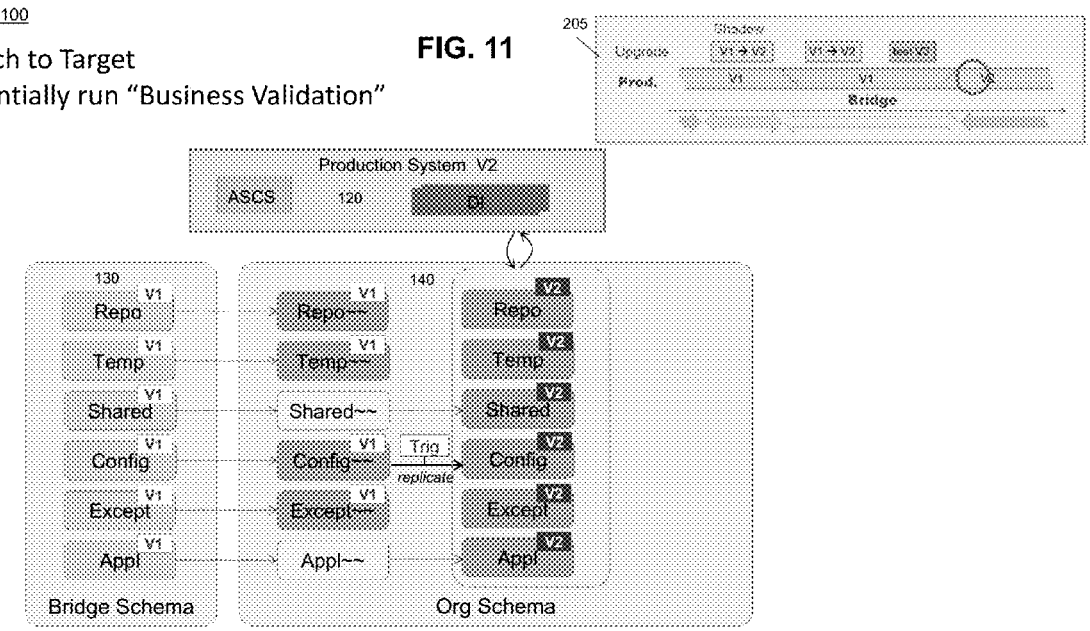

With reference to diagram 1100 of FIG. 11, users of the production system 120 (running V2) can be switched from bridge schema 130 to the original schema 140. Batches are phased out, users are logged off, and queues are run until they become empty.

Figure 12:
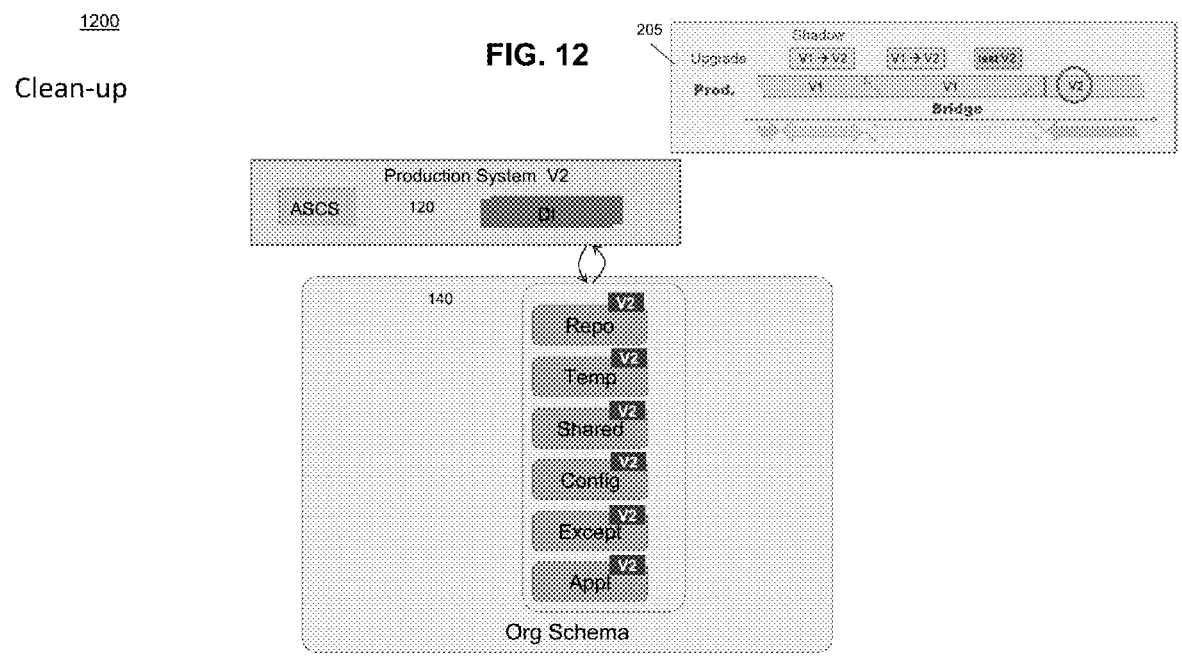
Figure 13:
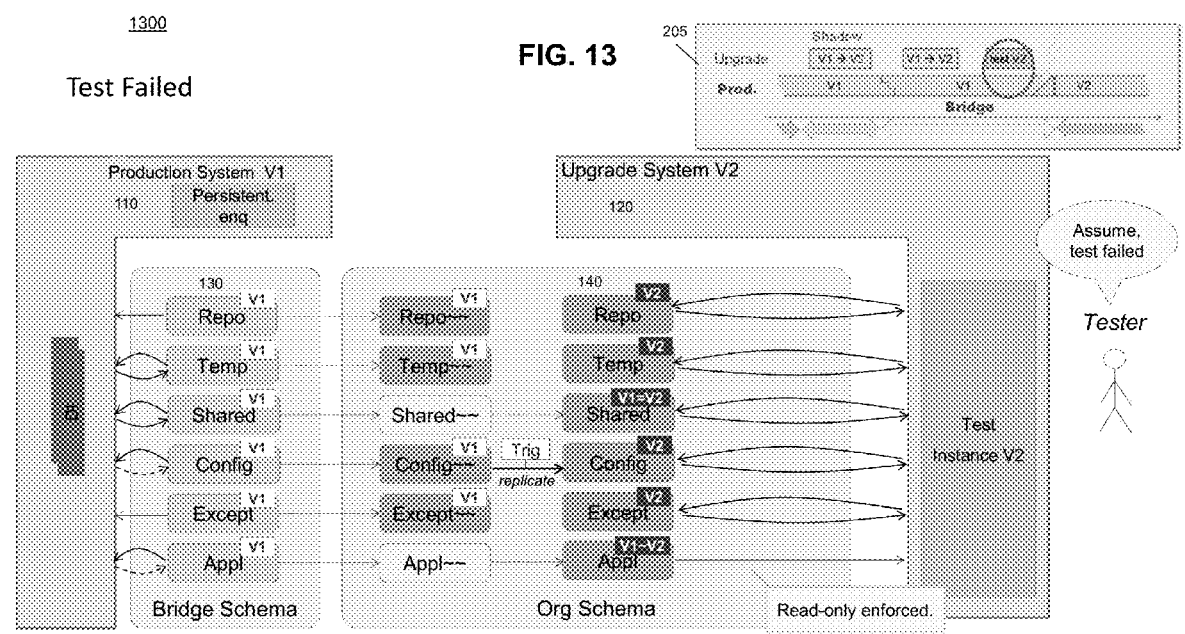
Figure 14:
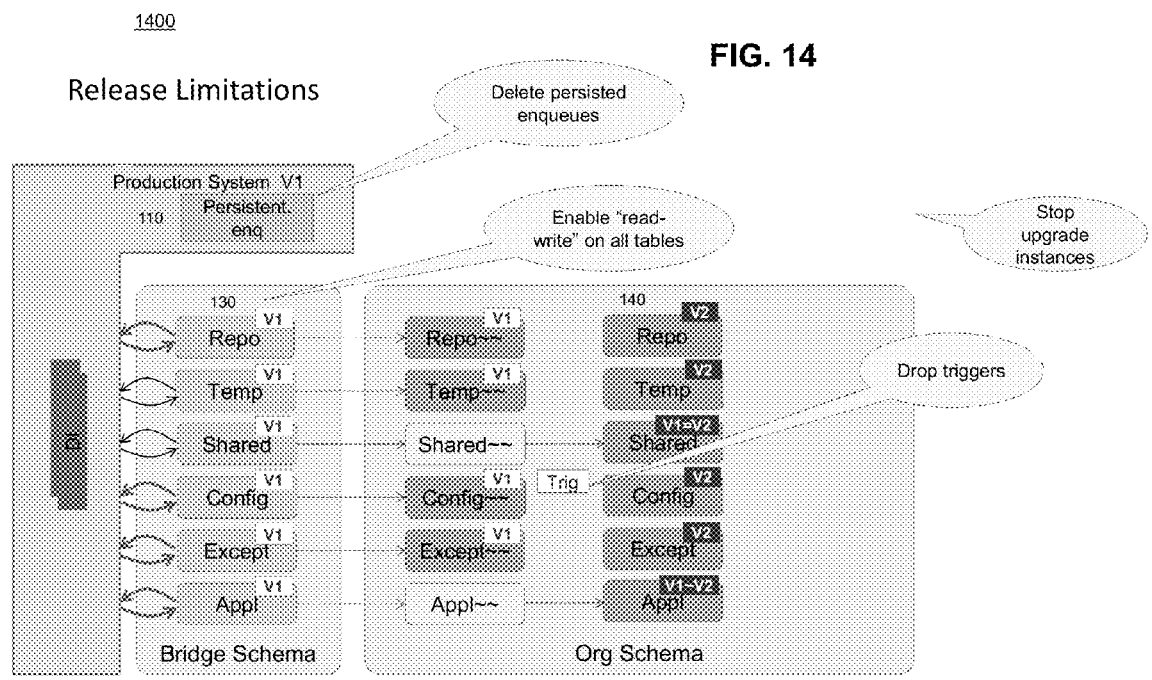

With reference to diagram 1200 of FIG. 12, the target system (production system 120) is next opened for all users. In addition, upgrade artifacts can be cleaned up.

A faster revoke procedure with limited downtime is shown in FIGS. 13-19. Initially, it can be determined that the tests failed and so a revoke procedure must be initiated (diagram 1300 of FIG. 13). With reference to diagram 1400 of FIG. 14, an emergency exit procedure commences in which upgrade dialog instances are stopped. In addition, any limitations set by the upgrade procedure for production are removed. For example, the persistent locks are dropped (releasing the locks for "Config" and "Appl" tables). The tables which had been read-only are put to read-write ("Except"). Maintenance mode is switched off (releasing the lock for "Repo"). In addition, the database triggers are dropped.

With reference to diagram 1500 of FIG. 15, the production system is stopped by finishing batch jobs, logging off users, and emptying message queue (queue is stopped form taking new entries and existing entries are processed).

With reference to diagram 1600 of FIG. 16, target tables are dropped and structure changes are revoked. The clone tables which had been copied from the source for the target are now dropped: ("Repo", "Temp", "Config", "Except"). The fields added to tables of category "Shared" and "Appl" are dropped. Content which might have been written by the upgrade to "Shared" tables is deleted (ensuring there is no key collision with content written by production).

With reference to diagram 1700 of FIG. 17, a switch back is initiated in which, for the categories "Repo", "Temp", Config" and "Except", the smart switch is run in the other direction by renaming table "Repo~~" to "Repo".

Figure 18:
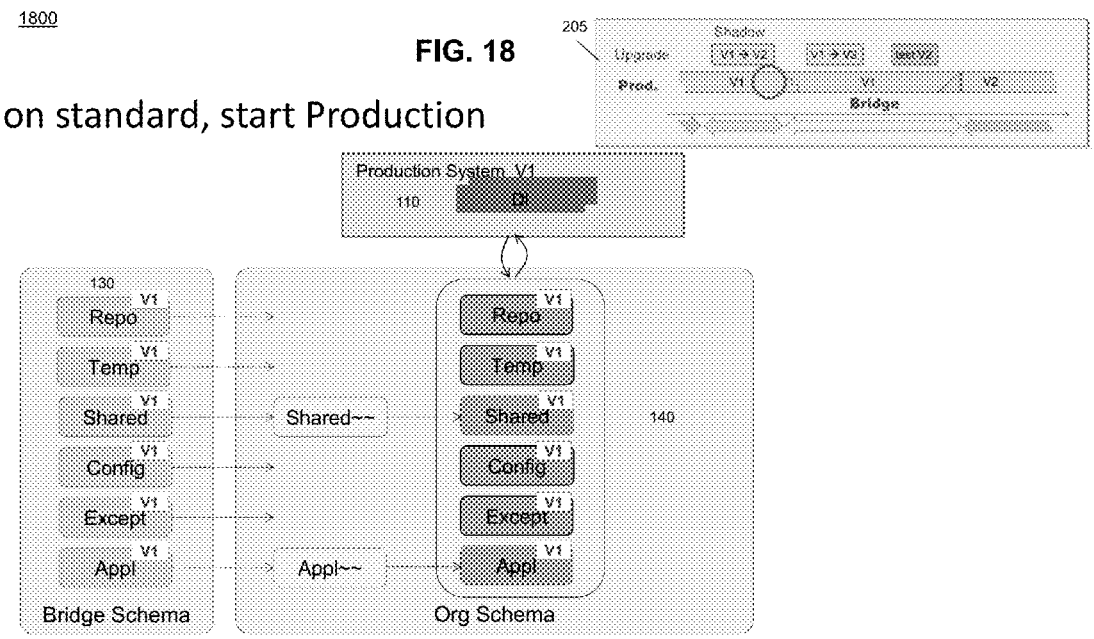
Figure 19:
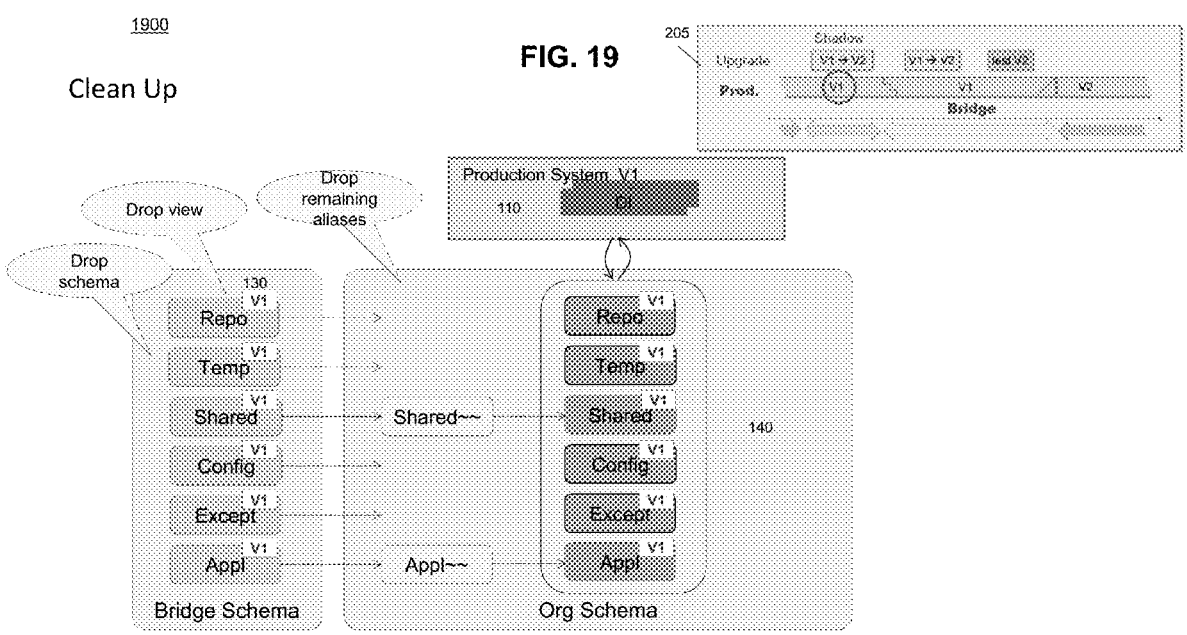
Figure 20:
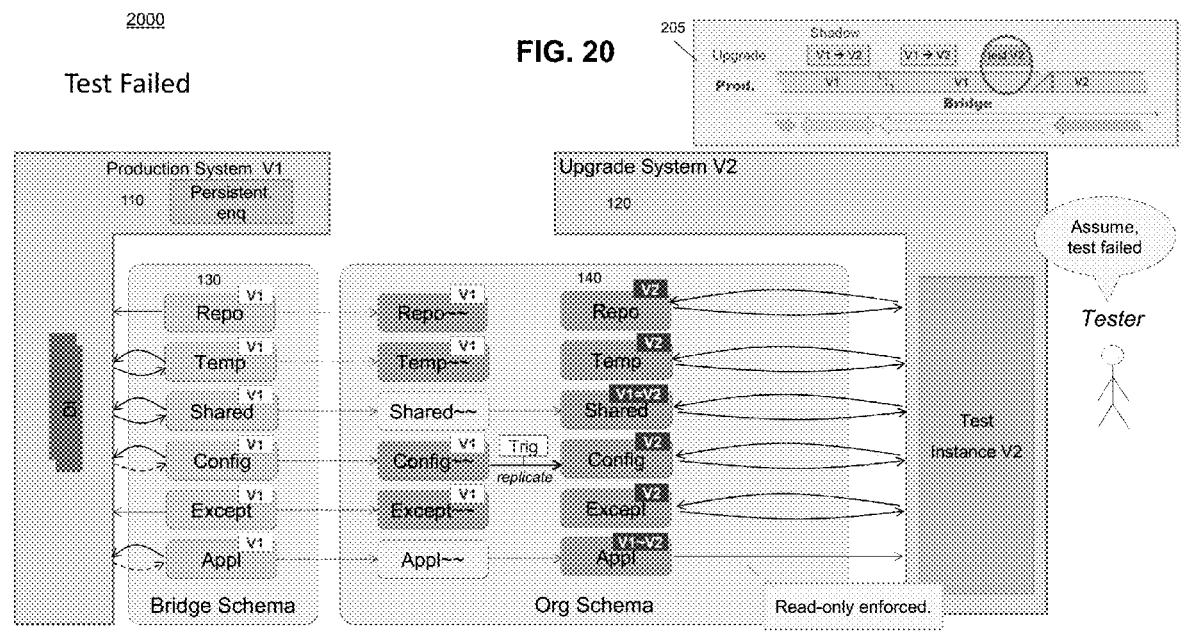
Figure 21:
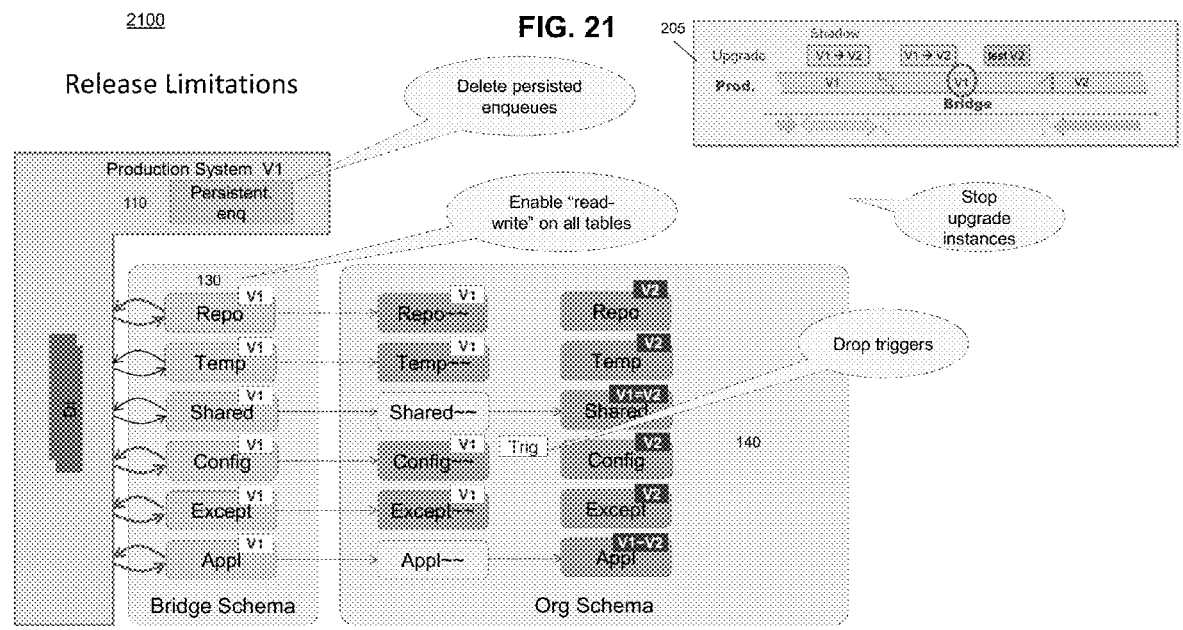

With reference to diagram 1800 of FIG. 18, production is started by reconnecting to the original schema 140. The connect is reconfigured from the database bridge schema 130 to original schema 140. Production instances are started and users can login With reference to diagram 1900 of FIG. 19, the upgrade artifacts are removed by dropping alias "Appl~~", dropping all views in bridge schema 130 (Repo, Except, . . . ), and then dropping the bridge schema 130.

FIGS. 20-27 illustrate a revoke procedure that does not require downtime. Initially, it can be determined that the tests failed and so a revoke procedure must be initiated (diagram 2000 of FIG. 20). With reference to diagram 2100 of FIG. 21, an emergency exit procedure commences in which upgrade dialog instances are stopped. In addition, any limitations set by the upgrade procedure for production are removed. For example, the persistent locks are dropped (releasing the locks for "Config" and "Appl" tables). The tables which had been read-only are put to read-write ("Except"). Maintenance mode is switched off (releasing the lock for "Repo"). In addition, the database triggers are dropped.

Figure 22:
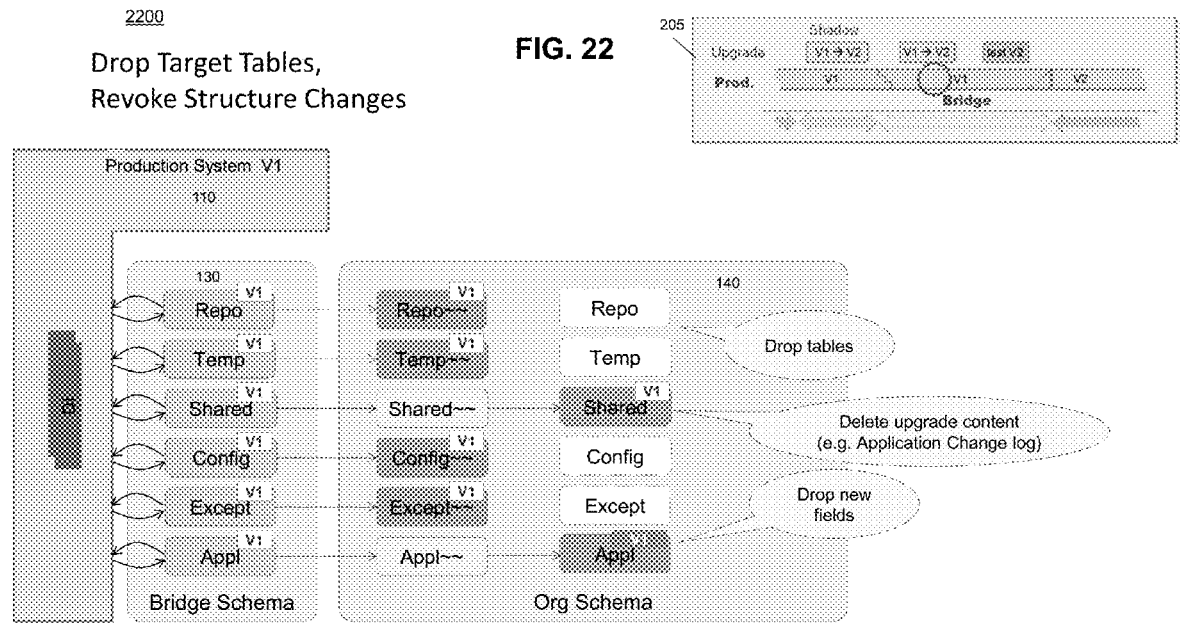

With reference to diagram 2200 of FIG. 22, target tables are dropped and structure changes are revoked. The tables which had been cloned for the target system 120 are now dropped: ("Repo", "Temp", "Config", "Except"). The fields added to tables of category "Shared" and "Appl" are dropped. Content which might have been written by the upgrade to "Shared" tables is deleted (ensuring there is no key collision with content written by production).

Figure 23:
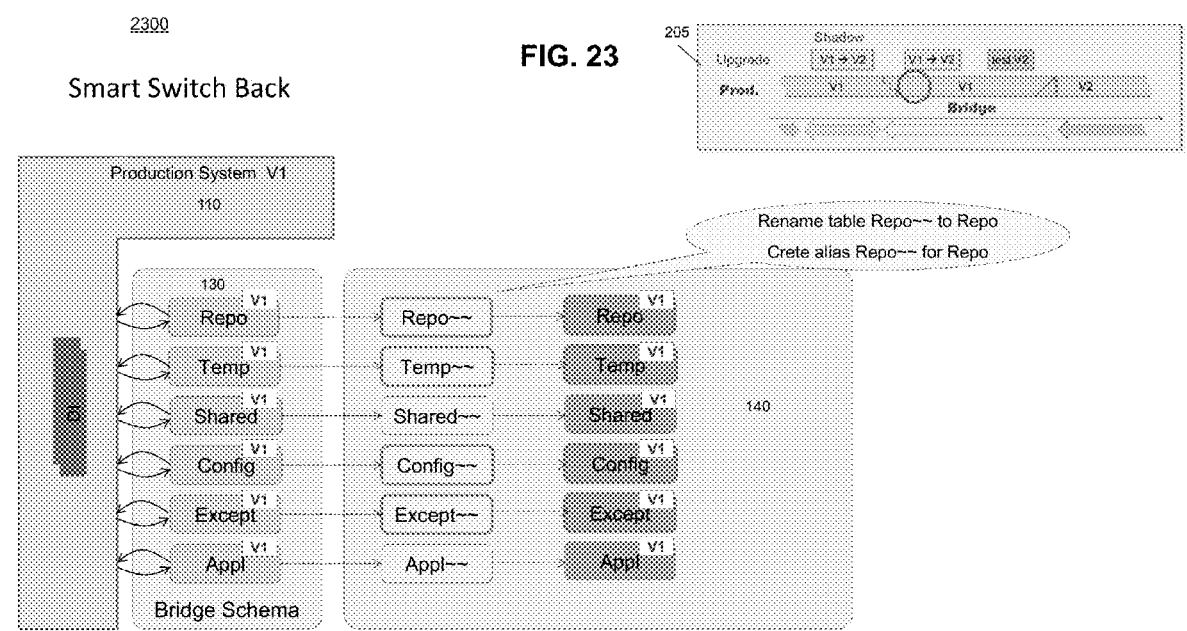
Figure 25:
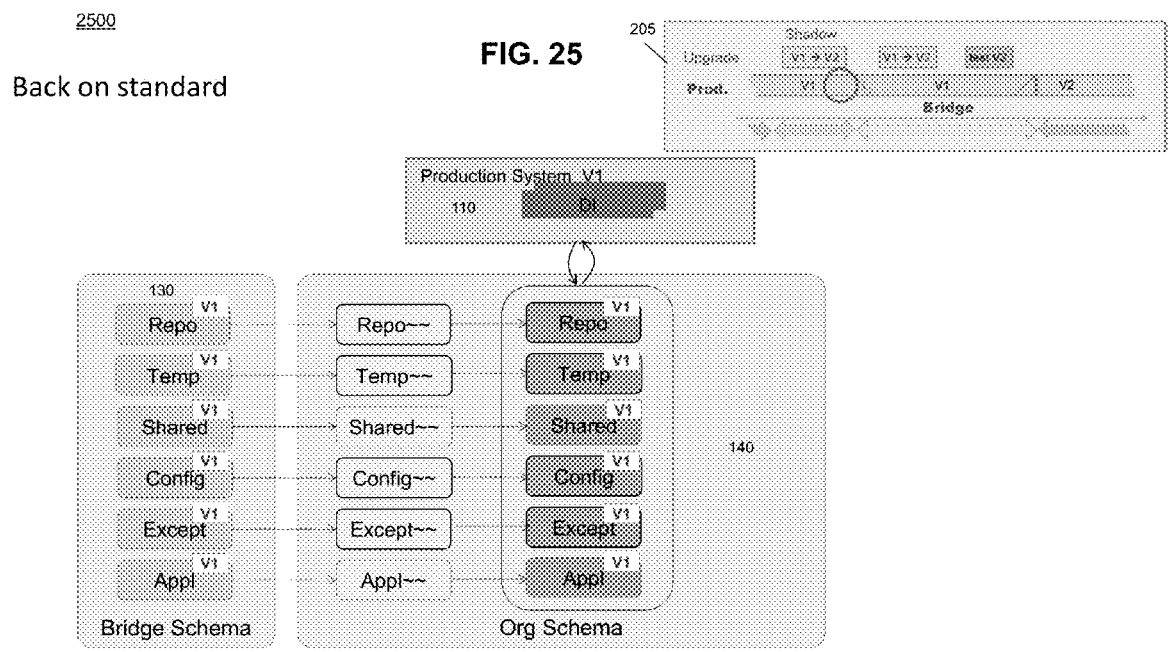

With reference to diagram 2300 of FIG. 23, a smart switch back can be initiated in which, for the categories "Repo", "Temp", Config" and "Except", the smart switch is run in the other direction. Table "Repo~~" is renamed to "Repo" and alias "Repo~~" is created for "Repo".

Figure 24:
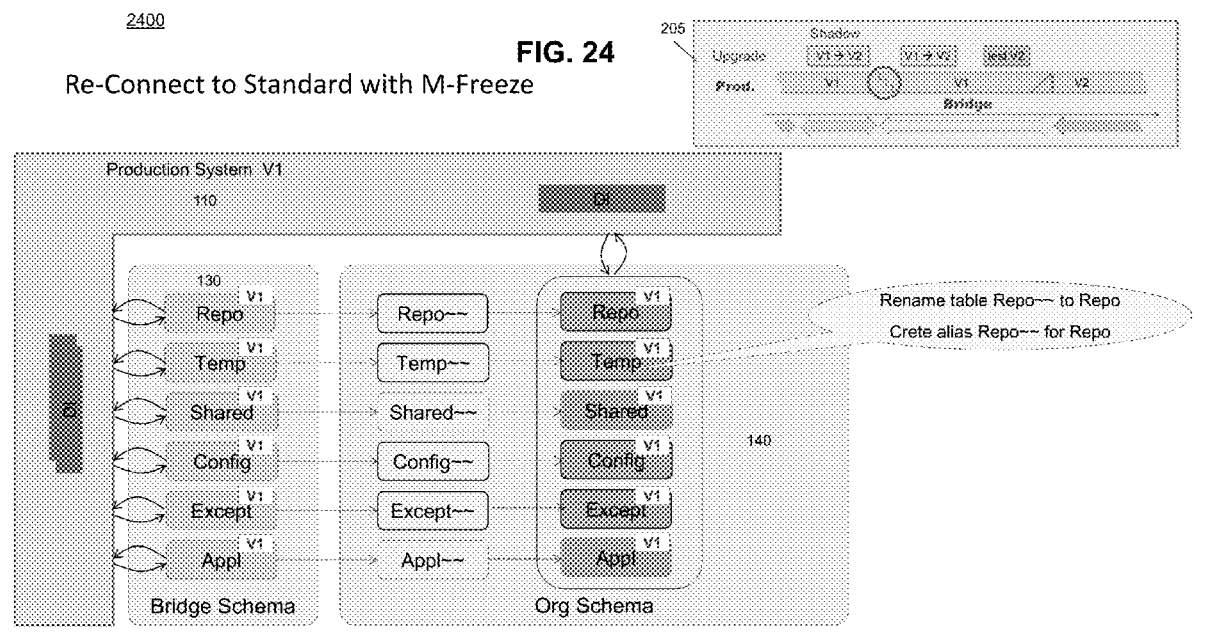

With reference to diagram 2400 of FIG. 24, a reconnection is made to the original schema 140 with a micro-freeze in which dialog instances suspend all actions by users, and the database bridge schema 130 is disconnected and a connection is made to the original schema 140. In another variation, the re-connect can be done on a work process by work process, when the user session sends a DB commit With reference to diagram 2500 of FIG. 25, the users are now all on dialog instances connected to the original schema 140 and operate on tables having the start release structure and content.

Figure 26:
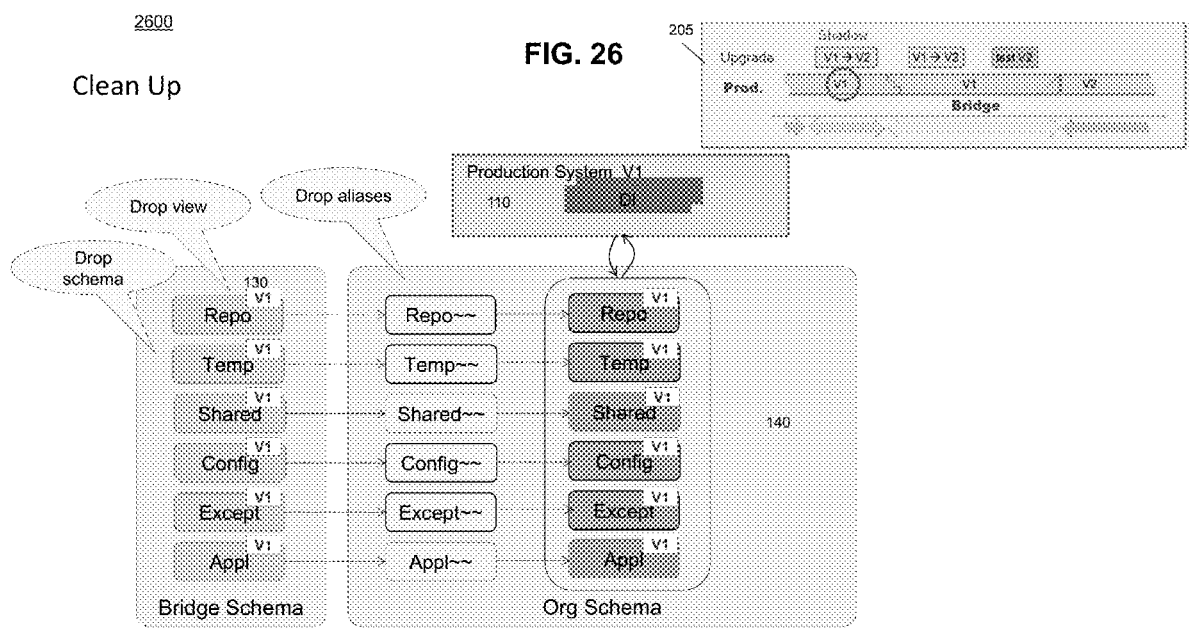
Figure 27:
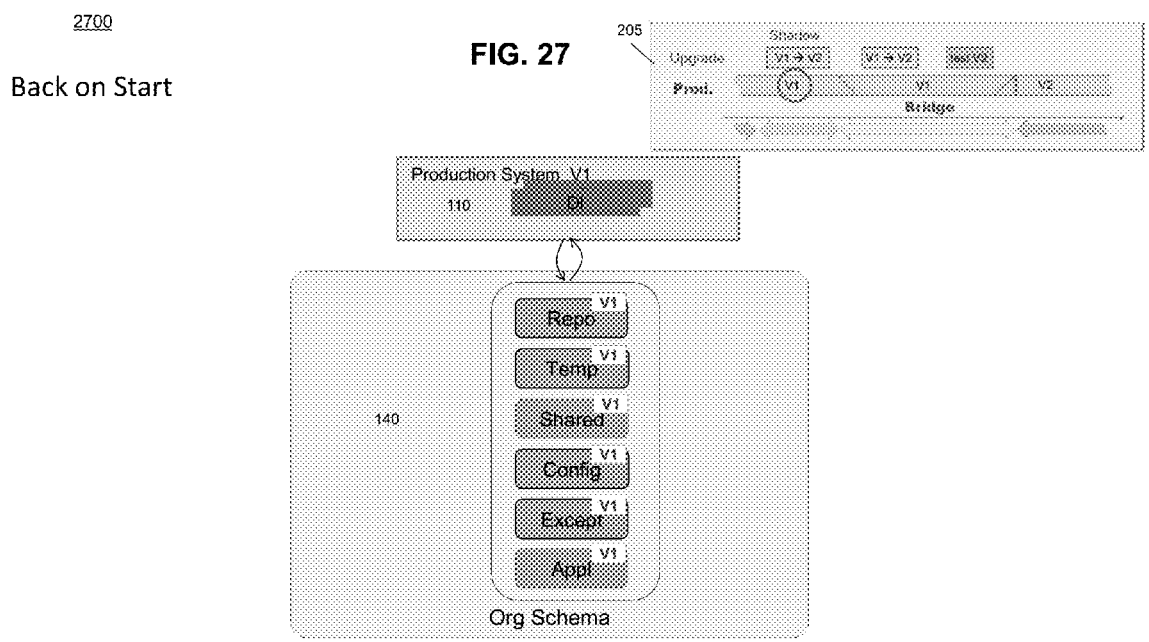

With reference to diagram 2600 of FIG. 26, the upgrade artifacts are removed by dropping alias "Repo~~", all views (e.g. Repo) in bridge schema 130 as well as the bridge schema 130. With reference to diagram 2700 of FIG. 27, cleanup has now been completed and production system 110 is connected to the original database schema 140.

Figure 28:
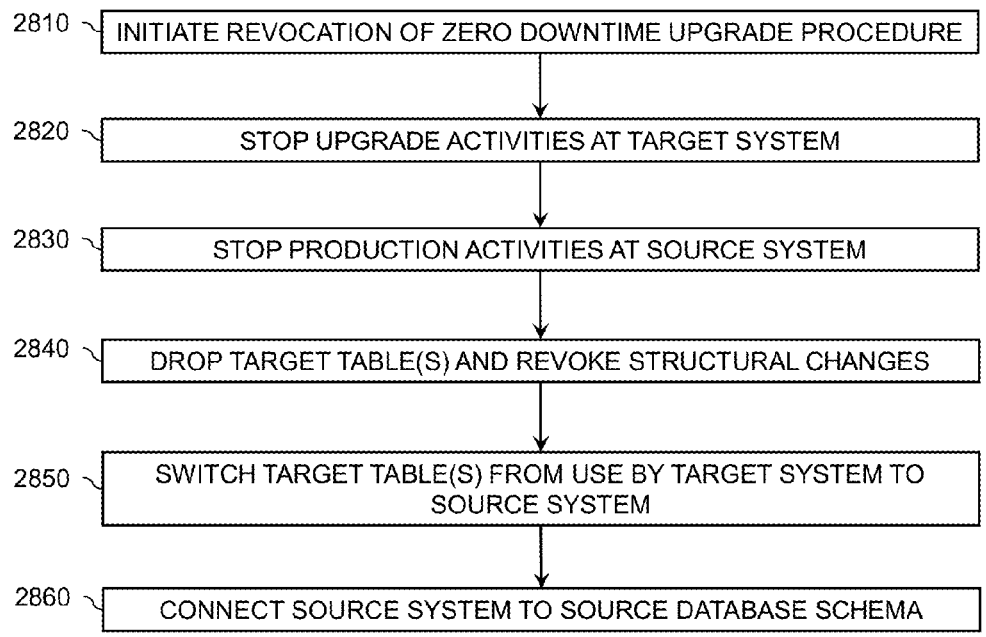
FIG. 28 is a process flow diagram illustrating revocation of a zero downtime upgrade procedure with reduced downtime.

FIG. 28 is a process flow diagram illustrating revocation of a zero downtime upgrade procedure that requires reduced downtime. Initially, at 2810, revocation of a zero downtime upgrade of an upgrade procedure of a source system to a target system is initiated. The upgrade procedure prepares software for the target system in parallel to operation of the source system by selectively (i) renaming source tables of the source system, (ii) cloning the renamed source tables for the target system, (iii) equipping the cloned tables with equipped with database triggers to transfer data to target tables used by the source system according to a source database schema, (iv) generating the target tables comprising updated software content for later use by the target system while the source tables are used via a bridge database schema, and (v) sharing tables between the source database schema accessed via the bridge database schema and the target system. Thereafter, at 2820, upgrade activities at the target system are stopped. Further, at 2830, production activities at the source system are stopped. Next, at 2840, target tables are dropped and any associated table structure changes are revoked. At 2850, at least a portion of the target tables are switched from use by the target system to use by the source system. The source system is then connected, at 2860, to the source database schema to enable use of the source system in its state prior to the initiation of the upgrade procedure.

Figure 29:
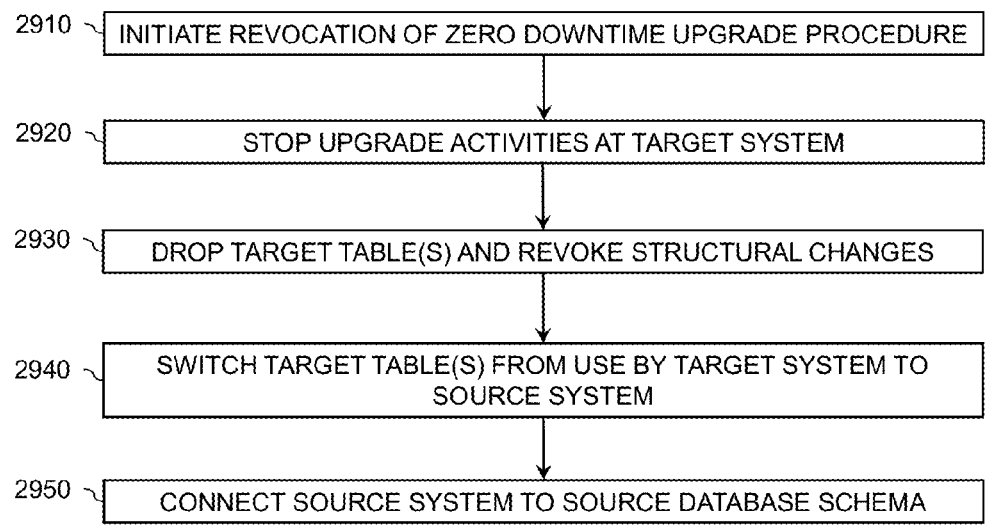
FIG. 29 is a process flow diagram illustrating revocation of a zero downtime upgrade procedure with no downtime.

FIG. 29 is a process flow diagram illustrating revocation of a zero downtime upgrade procedure that requires no downtime. Initially, at 2910, revocation of a zero downtime upgrade of an upgrade procedure of a source system to a target system is initiated. The upgrade procedure prepares software for the target system in parallel to operation of the source system by selectively (i) renaming source tables of the source system, (ii) cloning the renamed source tables for the target system, (iii) equipping the cloned tables with equipped with database triggers to transfer data to target tables used by the source system according to a source database schema, (iv) generating the target tables comprising updated software content for later use by the target system while the source tables are used via a bridge database schema, and (v) sharing tables between the source database schema accessed via the bridge database schema and the target system. Thereafter, at 2920, upgrade activities at the target system are stopped. Next, at 2930, target tables are dropped and any associated table structure changes are revoked. At 2940, at least a portion of the target tables are switched from use by the target system to use by the source system. The source system is then connected, at 2950, to the source database schema to enable use of the source system in its state prior to the initiation of the upgrade procedure.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   initiating revocation of a zero downtime upgrade procedure upgrading a source system to a target system, wherein the zero downtime upgrade procedure prepares software for the target system in parallel to operations of the source system by selectively (i) renaming source tables of the source system, (ii) cloning the renamed source tables of the source system for the target system, (iii) equipping the cloned renamed source tables of the source system with database triggers to transfer data to target tables used by the source system according to a source database schema, (iv) generating the target tables comprising updated software content for later use by the target system while the source tables of the source system are used via a bridge database schema, and (v) sharing tables between the source database schema accessed via the bridge database schema and the target system;
   stopping upgrade activities at the target system;
   stopping production activities at the source system;
   dropping at least a portion of the target tables and revoking any associated table structure changes;
   switching at least a portion of the target tables from use by the target system to use by the source system; and
   connecting the source system to the source database schema to enable use of the source system in its state prior to an initiation of the zero downtime upgrade procedure.

2. The method of claim 1, wherein the stopping of the upgrade activities at the target system comprises at least one of: stopping upgrade dialog instances, removing limitations on writing for at least a portion of the shared tables, or dropping the cloned renamed source tables of the source system and dropping database triggers on the source tables of the source system.

3. The method of claim 1, wherein the stopping of the production activities at the source system comprises at least one of: finishing batch jobs, logging off users, or running any queues until the queues become empty.

4. The method of claim 1, wherein the dropping of the at least a portion of the target tables and revoking any associated table structure changes comprises at least one of: dropping the cloned renamed source tables of the source system, dropping pre-defined fields added to at least one of the generated target tables, or deleting at least a portion of content added to tables shared by the source system and the target system.

5. The method of claim 1, wherein the switching of the at least a portion of the target tables from use by the target system to use by the source system comprises renaming at least one table according to a format used by the source database schema.

6. The method of claim 1, wherein the connecting of the source system to the source database schema comprises starting production instances and enabling users to login.

7. The method of claim 1, further comprising:
removing any artifacts associated with the zero downtime upgrade procedure.

8. The method of claim 7, wherein the artifacts comprise at least one of: an alias of a table, a view of a table, the bridge database schema, or objects temporarily created by the zero downtime upgrade procedure for the duration of the zero downtime upgrade procedure.

9. A method comprising:
initiating revocation of a zero downtime upgrade procedure upgrading a source system to a target system, wherein the zero downtime upgrade procedure prepares software for the target system in parallel to operations of the source system by selectively (i) renaming source tables of the source system, (ii) cloning the renamed source tables of the source system for the target system, (iii) equipping the cloned renamed source tables of the source system with database triggers to transfer data to target tables used by the source system according to a source database schema, (iv) generating the target tables comprising updated software content for later use by the target system while the source tables of the source system are used via a bridge database schema, and (v) sharing tables between the source database schema accessed via the bridge database schema and the target system;
stopping upgrade activities at the target system;
stopping production activities at the source system;
dropping the target tables and revoking any associated table structure changes;
switching at least a portion of the target tables from use by the target system to use by the source system; and
connecting the source system to the source database schema to enable use of the source system in its state prior to an initiation of the zero downtime upgrade procedure.

10. The method of claim 9, wherein the stopping of the upgrade activities at the target system comprises at least one of: stopping upgrade dialog instances, removing limitations on writing for at least a portion of the shared tables, or dropping the cloned renamed source tables of the source system and dropping database triggers on the source tables of the source system, and wherein the stopping of the production activities at the source system comprises at least one of: finishing batch jobs, logging off users, or running any queues until the queues become empty.

11. The method of claim 9, wherein the dropping of the target tables and revoking any associated table structure changes comprises at least one of: dropping the cloned renamed source tables of the source system, dropping predefined fields added to at least one of the generated target tables, or deleting at least a portion of content added to tables shared by the source system and the target system.

12. The method of claim 9, wherein the switching of the at least a portion of the target tables from use by the target system to use by the source system comprises at least one of: renaming at least one table or creating an alias for at least one of the target tables.

13. The method of claim 9, wherein the connecting of the source system to the source database schema comprises suspending all actions by users, disconnecting from a bridge database schema bridging the source database schema to a target database schema, and connecting to the source database schema.

14. The method of claim 9, further comprising:
removing any artifacts associated with the zero downtime upgrade procedure.

15. The method of claim 14, wherein the artifacts comprise at least one of: an alias of a table, a view of a table, the bridge database schema, or objects temporarily created by the zero downtime upgrade procedure for the duration of the zero downtime upgrade procedure.

16. A system comprising:
at least one data processor; and
a memory storing instructions which, when executed by the at least one data processor, result in operations comprising:
initiating revocation of a zero downtime upgrade procedure upgrading a source system to a target system, wherein the zero downtime upgrade procedure prepares software for the target system in parallel to operations of the source system by selectively (i) renaming source tables of the source system, (ii) cloning the renamed source tables of the source system for the target system, (iii) equipping the cloned renamed source tables of the source system with database triggers to transfer data to target tables used by the source system according to a source database schema, (iv) generating the target tables comprising updated software content for later use by the target system while the source tables of the source system are used via a bridge database schema, and (v) sharing tables between the source database schema accessed via the bridge database schema and the target system;
stopping upgrade activities at the target system;
stopping production activities at the source system;
dropping the target tables and revoking any associated table structure changes;
switching at least a portion of the target tables from use by the target system to use by the source system; and
connecting the source system to the source database schema to enable use of the source system in its state prior to an initiation of the zero downtime upgrade procedure.

17. The system of claim 16, wherein the stopping of the upgrade activities at the target system comprises at least one of: stopping upgrade dialog instances, removing limitations on writing for at least a portion of the shared tables, or dropping the cloned renamed source tables of the source system and dropping database triggers on the source tables of the source system, and wherein the stopping of the production activities at the source system comprises at least one of: finishing batch jobs, logging off users, or running any queues until the queues become empty.

18. The system of claim 16, wherein the dropping of the target tables and revoking any associated table structure changes comprises at least one of: dropping the cloned renamed source tables of the source system, dropping predefined fields added to at least one of the generated target tables, or deleting at least a portion of content added to tables shared by the source system and the target system.

19. The system of claim 16, wherein the switching of the at least a portion of the target tables from use by the target system to use by the source system comprises at least one of: renaming at least one table or creating an alias for at least one of the target tables.

* * * * *